US008448221B2

(12) United States Patent
Pearcy et al.

(10) Patent No.: US 8,448,221 B2
(45) Date of Patent: May 21, 2013

(54) SYSTEM, METHOD, AND COMPUTER PROGRAM PRODUCT FOR DISPLAYING NETWORK EVENTS IN TERMS OF OBJECTS MANAGED BY A SECURITY APPLIANCE AND/OR A ROUTING DEVICE

(75) Inventors: Derek Patton Pearcy, San Francisco, CA (US); Jose Caldera, Palo Alto, CA (US)

(73) Assignee: McAfee, Inc., Santa Clara, CA (US)

( * ) Notice: Subject to any disclaimer, the term of this patent is extended or adjusted under 35 U.S.C. 154(b) by 350 days.

(21) Appl. No.: 12/723,558

(22) Filed: Mar. 12, 2010

(65) Prior Publication Data
US 2011/0225622 A1 Sep. 15, 2011

(51) Int. Cl.
*H04L 29/06* (2006.01)

(52) U.S. Cl.
USPC .............................................. 726/1

(58) Field of Classification Search
USPC ............... 715/734, 735, 736; 709/224; 726/1
See application file for complete search history.

(56) References Cited

U.S. PATENT DOCUMENTS

| | | | |
|---|---|---|---|
| 5,987,610 A | 11/1999 | Franczek et al. | |
| 5,999,179 A * | 12/1999 | Kekic et al. | 715/734 |
| 6,073,142 A | 6/2000 | Geiger et al. | |
| 6,453,345 B2 * | 9/2002 | Trcka et al. | 709/224 |
| 6,460,050 B1 | 10/2002 | Pace et al. | |
| 6,502,131 B1 * | 12/2002 | Vaid et al. | 709/224 |
| 6,505,245 B1 | 1/2003 | North et al. | |
| 6,788,315 B1 * | 9/2004 | Kekic et al. | 715/733 |
| 6,816,973 B1 | 11/2004 | Gleichauf et al. | |
| 7,362,752 B1 | 4/2008 | Kastenholz | |
| 7,418,733 B2 * | 8/2008 | Connary et al. | 726/25 |
| 7,506,155 B1 | 3/2009 | Stewart et al. | |
| 7,653,720 B1 | 1/2010 | Steeves | |
| 7,926,113 B1 * | 4/2011 | Gula et al. | 726/25 |
| 7,958,238 B1 | 6/2011 | Batz et al. | |
| 7,984,452 B2 * | 7/2011 | Chakravarty et al. | 719/318 |
| 8,190,734 B2 | 5/2012 | Cooper | |
| 2002/0024535 A1 * | 2/2002 | Ueno et al. | 345/736 |
| 2003/0023711 A1 | 1/2003 | Parmar | |
| 2003/0061506 A1 * | 3/2003 | Cooper et al. | 713/201 |
| 2003/0110192 A1 * | 6/2003 | Valente et al. | 707/513 |
| 2003/0174718 A1 | 9/2003 | Sampath | |
| 2003/0179742 A1 | 9/2003 | Ogier et al. | |
| 2004/0052260 A1 | 3/2004 | Tabu | |
| 2004/0199792 A1 | 10/2004 | Tan et al. | |
| 2004/0205247 A1 | 10/2004 | Ahn | |
| 2004/0221190 A1 * | 11/2004 | Roletto et al. | 714/4 |
| 2004/0223502 A1 | 11/2004 | Wybenga et al. | |
| 2005/0195831 A1 | 9/2005 | Wybenga et al. | |
| 2006/0069858 A1 | 3/2006 | Abdat | |
| 2006/0120382 A1 | 6/2006 | Thubert et al. | |

(Continued)

FOREIGN PATENT DOCUMENTS

| | | |
|---|---|---|
| EP | 1054529 A2 | 11/2000 |
| WO | WO-0203219 A1 | 1/2002 |

(Continued)

OTHER PUBLICATIONS

International Search Report and Written Opinion mailed Jun. 9, 2011 for International Application No. PCT/US2011/028258.

(Continued)

*Primary Examiner* — Michael S McNally
(74) *Attorney, Agent, or Firm* — Patent Capital Group, PC.

(57) ABSTRACT

A system, method, and computer program product are provided for displaying network events in terms of objects managed by at least one of a security appliance and a routing device. In use, network events are received. Furthermore, the network events are displayed in terms of objects being managed by at least one of a security appliance and a routing device.

20 Claims, 7 Drawing Sheets

U.S. PATENT DOCUMENTS

| | | | |
|---|---|---|---|
| 2006/0140127 | A1 | 6/2006 | Lee et al. |
| 2006/0277184 | A1 | 12/2006 | Faitelson et al. |
| 2007/0011297 | A1 | 1/2007 | Boylan |
| 2007/0067431 | A1 | 3/2007 | Yoshihara et al. |
| 2007/0150934 | A1 | 6/2007 | Fiszman et al. |
| 2008/0037583 | A1 | 2/2008 | Dawes et al. |
| 2008/0109870 | A1 | 5/2008 | Sherlock et al. |
| 2009/0182953 | A1 | 7/2009 | Merkey et al. |
| 2009/0292805 | A1 | 11/2009 | Cooper |
| 2010/0067390 | A1 | 3/2010 | Valente et al. |
| 2010/0100619 | A1* | 4/2010 | Chang et al. .......... 709/224 |
| 2011/0099500 | A1* | 4/2011 | Smith et al. .......... 715/771 |

FOREIGN PATENT DOCUMENTS

| | | | |
|---|---|---|---|
| WO | WO-2008-044225 | A2 | 4/2008 |
| WO | WO 2008/069442 | A1 | 6/2008 |
| WO | WO-2009142751 | A2 | 11/2009 |
| WO | WO 2011/113037 | | 9/2011 |

OTHER PUBLICATIONS

Komlodi et al., "A User-centered Look at Glyph-based Security Visualization," Visualization for Computer Security, 2005, IEEE Workshop on Minneapolis, MN, USA, Oct. 26, 2005, XP031385959.

Jain, A K, et al., "Data clustering: a review", ACM Computing Surveys, vol. 31, No. 3, XP002165131 ISSN: 0360-0300, (Sep. 1, 1999), 264-323.

Jitian, X, et al., "Measuring similarity of interests for clustering Web-users", Database Conference ADC Proceedings, XP010532230, ISBN: 978-0-7695-0966-2, (Jan. 29, 2001), 107-114, Abstract Only.

Komlodi, A, et al., "A User-centered Look at Glyph-based Security Visualization", Visualizations for Computer Security, IEEE Workshop XP031385959 ISBN: 978-0-7803-9477-3, (Oct. 26, 2005), 3 pages.

* cited by examiner

SYSTEM, METHOD, AND COMPUTER PROGRAM PRODUCT FOR DISPLAYING NETWORK EVENTS IN TERMS OF OBJECTS MANAGED BY A SECURITY APPLIANCE AND/OR A ROUTING DEVICE

FIELD OF THE INVENTION

The present invention relates to reporting data, and more particularly to reporting network events.

BACKGROUND

Traditionally, network events have been reported for making data associated with events occurring on a network available to users. As modern computing environments make more, and more interesting, data available to users, increasingly sophisticated tools have appeared to help people understand this data. Unfortunately, the reporting tools made available to date exhibit various deficiencies. For example, they are too general, and with such generality comes great flexibility but even greater user confusion. In addition they are too specialized, and in their excellence to satisfy the needs of users whose data sets have predictable qualities they obscure relationships which are themselves interesting data sets. To this end, conventional reporting tools have ineffectively represented the data.

Moreover, with respect to network events, the deficiencies noted above prevent all but the most basic and critical of alerts from rising out of the noise. For example, the reporting of such network events has been performed outside of the context of the policy by which raw data is filtered to create the network events, therefore dividing policy controls and object definitions from network events, resulting in a major impediment to network monitoring. There is thus a need for addressing these and/or other issues associated with the prior art.

SUMMARY

A system, method, and computer program product are provided for displaying network events in terms of objects managed by at least one of a security appliance and a routing device. In use, network events are received. Furthermore, the network events are displayed in terms of objects being managed by at least one of a security appliance and a routing device.

DETAILED DESCRIPTION

Figure 1:
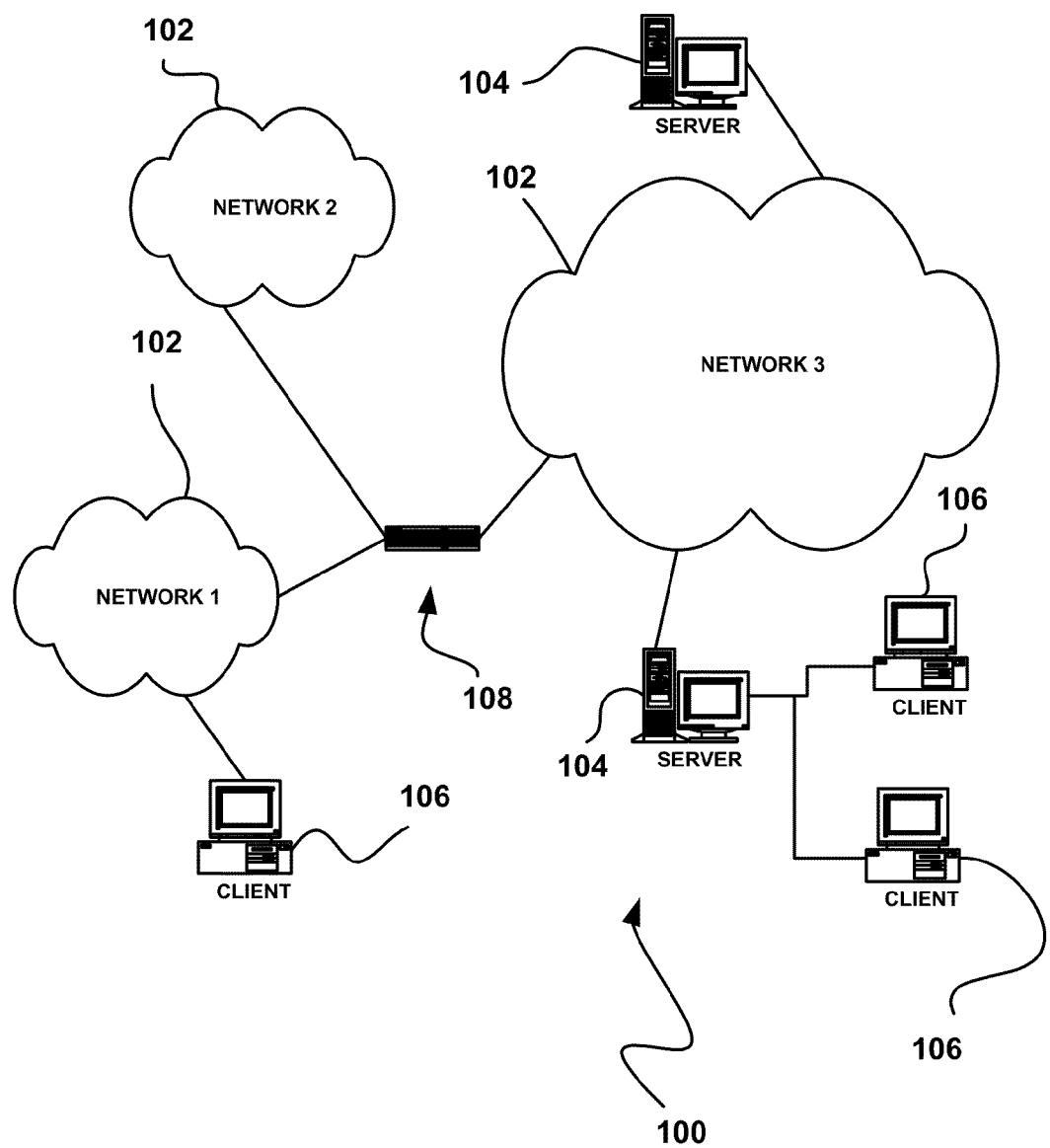
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
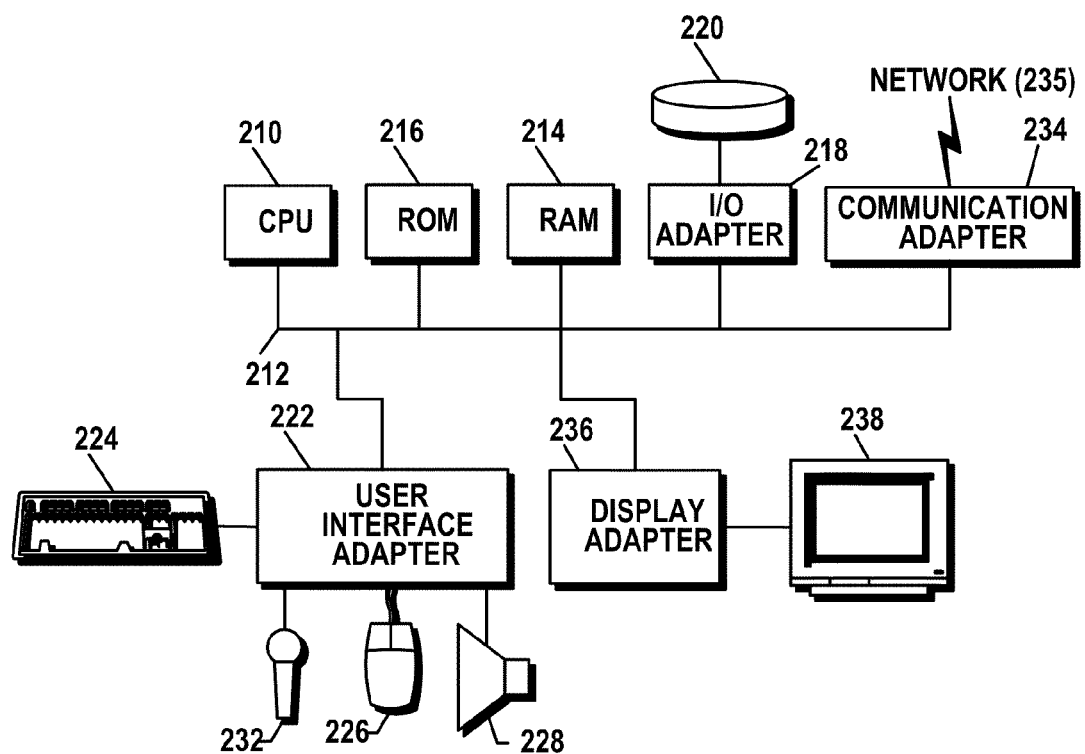
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
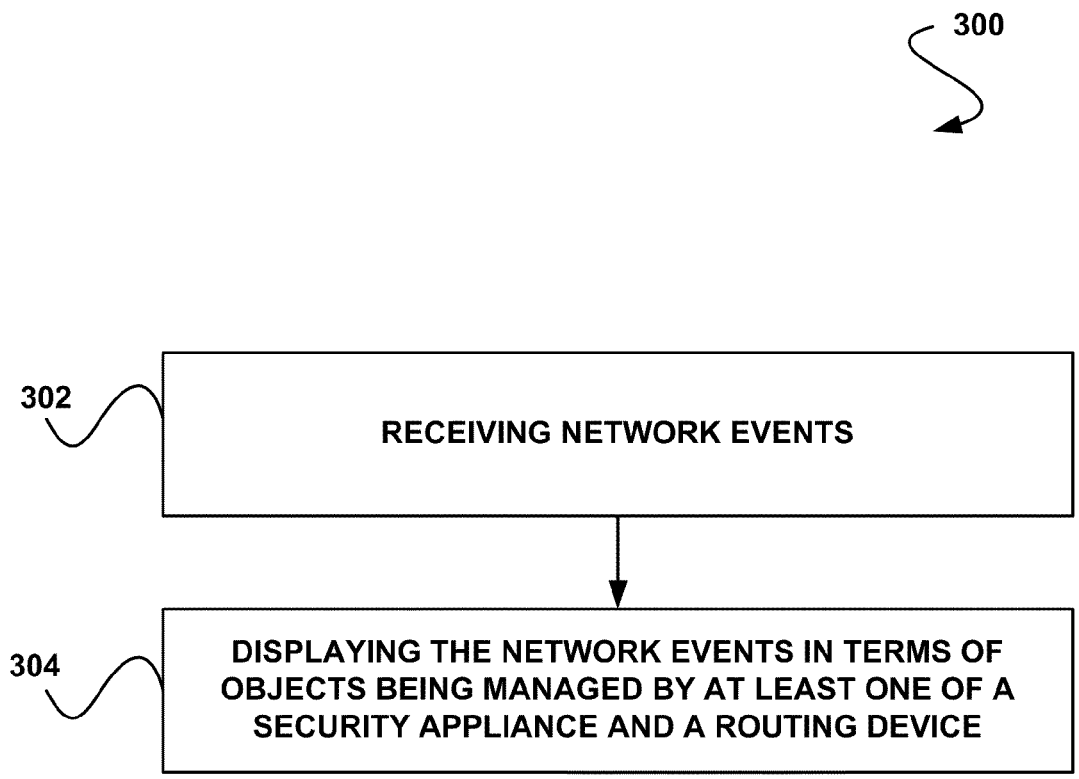
FIG. 3 shows a method for displaying network events in terms of objects managed by at least one of a security appliance and a routing device, in accordance with one embodiment.

FIG. 3 shows a method 300 for displaying network events in terms of objects managed by at least one of a security appliance and a routing device, in accordance with one embodiment. As an option, the method 300 may be carried out in the context of the architecture and environment of FIGS. 1 and/or 2. Of course, however, the method 300 may be carried out in any desired environment.

As shown in operation 302, network events are received. In the context of the present description, each of the network events may include any description associated with (e.g. of) network traffic processed by a security appliance (e.g. a firewall with a signature-based intrusion detection and prevention, a firewall without a signature-based intrusion detection and prevention, a stand-alone network traffic monitor, an active defense appliance such as a stand-alone intrusion prevention system/intrusion detection system, etc.) and/or a routing device (e.g. a router, a router within a switch, etc.). Thus, the network events may be received (e.g. in the form of an audit log, etc.) from the security appliance and/or the routing device in response to the processing of the associated network traffic by the security appliance and/or the routing device.

In one embodiment, the description of the network traffic represented by the network events may identify a source of the network traffic. The source may include a username of a user from which the network traffic originated, an internet protocol (IP) address of a device from which the network traffic originated, a group identifier of a group of devices from which the network traffic originated, etc. In another embodiment, the description of the network traffic represented by the network events may identify a destination of the network traffic. The destination may include an IP address of a device to which the network traffic was destined, a group identifier of a group of devices to which the network traffic was destined, etc.

In still yet another embodiment, the description of the network traffic represented by the network events may identify an application utilized for communicating the network traffic. Such application may include any connection allowing the network traffic to be communicated from the source to the destination. For example, the application may include a port number, a service, a protocol, an identifier (e.g. any specific reference or identifier recognizable to a person experienced with computer network design and management) etc. In various other embodiments, the description of the network traffic represented by the network events may identify an amount of network traffic associated with the network event, a policy invoked for processing the network traffic, etc. In other various embodiments, the network events may include exploit signature alerts, vulnerability detections, or any other security-related data capable of being described in the same context as the network traffic.

Additionally, the network events may be generated based on a policy, and may, for example, each indicate a result of processing of network traffic based on the policy. For example, the network events may include denied network traffic or allowed network traffic. In one embodiment, a network event may indicate that network traffic was denied from being forwarded to the destination from the security appliance and/or routing device (e.g. based on a rule of the policy). In another embodiment, a network event may indicate that network traffic was allowed to be forwarded to the destination from the security appliance and/or routing device (e.g. based on a rule of the policy).

Furthermore, as shown in operation 304, the network events are displayed in terms of objects being managed by the security appliance and/or routing device. With respect to the present description, the objects being managed by the security appliance and/or routing device may include any resources and/or services that are managed by the security appliance and/or routing device. For example, the objects may include at least one source of network traffic from which the network events were generated, at least one destination of network traffic from which the network events were generated, and/or at least one application utilized for communicating network traffic from which the network events were generated.

In one embodiment, the objects may be managed based on a policy for processing (e.g. allowing or denying) network traffic associated with such objects. For example, a policy of the security appliance may define the objects being managed by the security appliance, the rules based on which the objects are managed, etc. As another example, a policy of an application displaying the network events in terms of the objects may define the objects being managed by the routing device, the rules based on which the objects are managed, etc.

As noted above, the network events may be generated based on the policy utilized for managing the network objects. To this end, by displaying the network events in terms of the objects being managed based on a policy by the security appliance and/or routing device, the network events may optionally be displayed in terms of the policy by way of the objects managed by the policy and the objects' relationships both to each other and to external entities as defined within the policy. For example, the objects may contain one another (e.g. fully, creating a hierarchy, or partially, creating overlapping sets). As another example, the objects can reference entities outside of the policy (e.g. an arbitrarily named object may be a placeholder for a user group, which contains a set of users which are managed on a separate server, such as a Microsoft® server).

In one embodiment, the network events may be displayed in terms of the objects being managed by the security appliance and/or routing device by displaying a summary of the network events utilizing a graph with axes indicative of the objects. For example, a first one of the axes may represent at least one source of network traffic from which the network events were generated, a second one of the axes may represent at least one destination of network traffic from which the network events were generated, and/or a third one of the axes may represent at least one application utilized for communicating network traffic from which the network events were generated. Further, a point on the graph may indicate at least one network event, and the point's intersection with the first axis, second axis and/or third axis may represent an association with the particular objects represented by the intersection point at the first axis, second axis and/or third axis.

In another embodiment, the displayed network events may include only a subset of all received network events. Just by way of example, the subset may include network events that occurred during a first time period selected by a user. The subset may further include network events that occurred during a second time period automatically selected based on the first time period (e.g. where the second time period is different from the first time period, the second time period is a period of time that is a predetermined amount of time prior to the first time period, etc.). In another embodiment, the network events may be displayed in terms of the objects being managed by the security appliance and/or routing device in a manner that compares the network events that occurred during the first time period with the network events that occurred during the second time period.

In yet another embodiment, the network events may be displayed on a device (e.g. the devices describe in FIGS. 1 and/or 2) that is separate from the security appliance and/or routing device. For example, the network events may be displayed on an administrator's device and/or any other user device for allowing a user to view the network events in terms of the objects being managed by the security appliance and/or routing device.

Of course, while multiple embodiments have been described above, it should be noted that the network events may be displayed in any manner that is in terms of the objects being managed by the security appliance and/or routing device. In this way, a visible reference between the network events and the objects associated with such network events may be provided by the aforementioned display. Such visible reference may allow a user to view network events with respect to the particular objects associated with (e.g. included in the description of) the network events. Accordingly, a user may select the objects for which viewing of associated network events is desired, thus filtering all network events based on the selected objects.

The visible reference may also be utilized such that the comparison of network events during different time periods may indicate an effect of a change to a configuration of the management of the objects (e.g. a configuration of the policy) that occurred between the first time period and the second time period. For example, such effect may include an effect on the objects being managed, such as more or less allowed or denied network traffic with respect to such objects. A user may optionally use such visible reference showing the effect of a change to a configuration of the management of the objects as a basis for subsequent changes to the configuration of the management of the objects.

Optionally, the user may configure the manner in which the objects are managed (e.g. by configuring the policy, object definitions, etc.) using the display of the network events in terms of the objects being managed by the security appliance and/or routing device. By allowing a sufficiently privileged user the ability to modify a policy utilized for network event generation within the context of the network events themselves, network event clarity may be increased and network event response times may be significantly shortened.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

FIGS. 4-7 show various embodiments of a graphical user interfaces (GUIs) 400-700 for displaying network events in terms of objects managed by at least one of a security appliance and a routing device, in accordance with another embodiment. As an option, the GUIs 400 may be implemented in the context of the architecture and environment of FIGS. 1-3. Of course, however, the GUIs 400 may be implemented in any desired environment. It should also be noted that the aforementioned definitions may apply during the present description.

Figure 4:
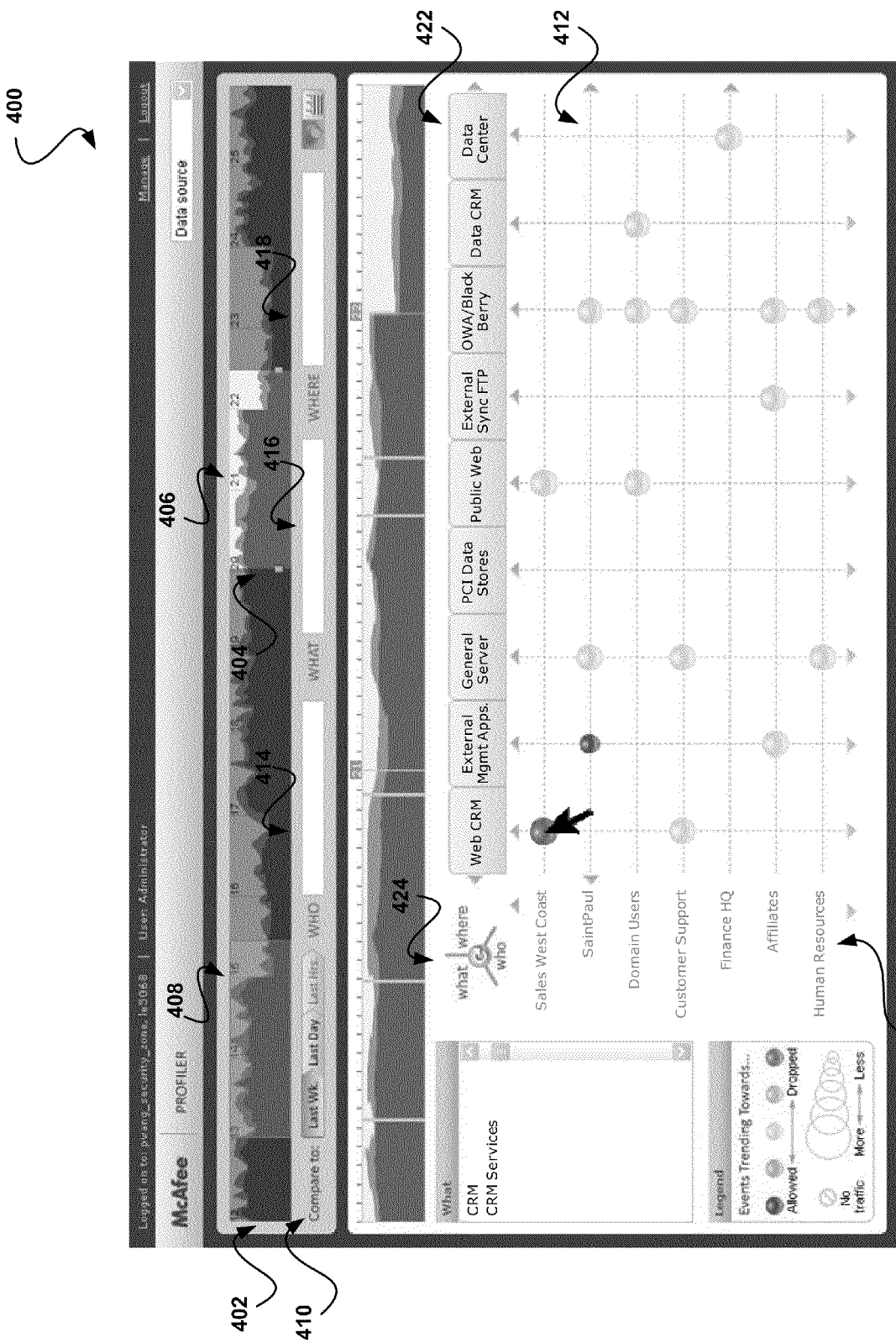
FIGS. 4-7 show various embodiments of a graphical user interfaces (GUIs) for displaying network events in terms of objects managed by at least one of a security appliance and a routing device, in accordance with another embodiment.

As shown in FIG. 4, the GUI 400 includes a trend graph 402 showing a volume of data over a particular timeframe. Specifically, the trend graph 402 shows how much data is available for the length of time represented by the graph. The data depicted by the trend graph 402 includes two types of data each shown as a different color for showing a comparison (e.g. ratio, etc.) thereof.

The data within the graph may be styled so as to illustrate the most basic difference across the network events about which the user is likely to be most concerned. For example, in the embodiment shown, the network events are largely from a firewall, a comparison of network events indicative of allowed network traffic (hereinafter allowed network events) and network events indicative of denied network traffic (hereinafter denied network events) may be illustrated. Additionally, the timeframe in the present GUI 400 is shown as a fixed number of days represented by calendar dates 12 through 25 (i.e. two weeks worth of data). In another embodiment, a multilayer trend graph may be provided with each higher layer being more vertically compressed and representing a wider timeframe.

Optionally, the trend graph 402 may always be visible in the GUIs 400-700. The trend graph 400 may include a plurality of context controls capable of being utilized by the user to filter the network events that are displayed in terms of objects managed by at least one of a security appliance and a routing device. For example, as shown, the trend graph 400 may include handle controls 404 for allowing the user to select a subset of the timeframe (hereinafter user selected timeframe 406).

Upon the user selecting the user selected timeframe 406, another timeframe is automatically selected (hereinafter automatically selected timeframe 408). The automatically selected timeframe 408 is selected based on a selected time period control 410, which may be selected by the user or otherwise selected by default. The selected time period control allows the automatically selected timeframe 408 to be selected according to a particular time period equivalent to the user selected timeframe 406 (e.g. an equivalent time period in the last week, an equivalent time period in the last day, etc.).

Thus, for example, if the user selected timeframe 406 includes less than a day, then the user may choose to compare against the equal number of previous hours, or the same time frame in the previous day or week; if the user selects a day, the user can compare to the previous day or the same day of the previous week; if the user selects more than one day, the user can only compare against the same timeframe in the previous week (e.g. if the user selected timeframe 406 includes a Tuesday through Wednesday time period, the equivalent time period in the last week may include the Tuesday through Wednesday time period in such last week).

By receiving the user selected timeframe 406 and the automatically selected timeframe 408, a bubble graph 412 of the GUI 400 may be automatically updated to display network data occurring during the user selected timeframe 406 and the automatically selected timeframe 408 in terms of objects managed by at least one of a security appliance and a routing device. In the embodiment shown, the bubble graph 412 may show the aforementioned network events as a comparison between the network events that occurred during the user-selected timeframe 406 and the network events that occurred during the automatically selected timeframe 408. As another option, if the network events include security alert information, then a threat-based trend visualization may also be presented. One example of a bubble graph is described in U.S. patent application Ser. No. 12/454,773, filed May 21, 2009 and entitled "System and Method for Discovery of Network Entities," which is herein incorporated by reference.

In addition to filtering the displayed network events across time, object controls 414-418 allow further filtering in terms of objects associated with the network events that are managed by the security appliance and/or routing device. As shown, the objects are each included in a dimension of the bubble graph 412. For example, objects that are a source of network traffic from which a network event is generated are included in a first dimension 420 (filtered using the WHO field 414), objects that are a destination of network traffic from which a network event is generated are included in a second dimension 422 (filtered using the WHERE field 414), and objects that are an application via which such network traffic is transmitted are included in a third dimension (filtered using the WHAT field 414). Optionally, the third dimension may be presented as a multi-select list, allowing the bubble graph 412 to be displayed as a two-dimensional graph using the first dimension and the second dimension.

As shown, a pivot control 424 may allow the user to change the type of objects (e.g. source, destination, application) that each dimension shows. Allowing the user to rotate through the three axes offers the user flexibility in quickly exploring relationships between objects (e.g. users by application, application by server group, server group by user group, etc.).

The objects that are a source of network traffic from which a network event is generated may include one or more of a user or computer identifier (ID) [e.g. directory record or domain name service (DNS) record], user groups, network IDs [e.g. IP addresses or address range, media access control (MAC) addresses], the geographic origin or destination of the event, security events or references associated with specifics of the event, and other product- or policy-specific objects. The objects that are a destination of network traffic from which a network event is generated may be the same as those that are a source of network traffic from which a network event is generated. The objects that are an application via which such network traffic is transmitted may describe the nature of the channel between the source objects and the destination objects, such as services, groups of services, protocols, transmission control protocol/user datagram protocol (TCP/UDP) ports, and other application definitions.

While text entry fields are shown for the object controls 414-418 that allow further filtering in terms of objects associated with the network events that are managed by the security appliance and/or routing device, an icon or other control may also be displayed with respect to each of the object controls 414-418 for allowing the user to narrow the displayed network events to a specific sub-dimension of objects. In another embodiment, attempts to filter the objects would result in a filtered list of both all matching results, as well as related results, to allow the user to quickly and correctly narrow their queries with less guesswork. The related results may be represented visually in a hierarchy, allowing the user to drill up or down into less or more specific definitions containing the object of interest. For example, searching for an object that is the user group "Development" may produce too narrow a result set. By showing which other user group objects contain the original group ("All Employees>Santa Clara>Engineering>Development") the user is given both an easier way to expand filter criteria and greater context into the objects against which the network events were originally characterized.

The network events included in the user selected timeframe 406 and the automatically selected timeframe 408 are represented as bubbles 426 in the bubble graph 412. Thus, each bubble 426 represents the interaction between two objects on different axes. As shown, each bubble 426 summarizes the change between the network events that occurred during the user selected timeframe 406 and the network events that occurred during the automatically selected timeframe 408. For example, the color of each bubble 426 may indicate whether the network events associated with the objects intersected by the bubble 426 trend towards being allowed, denied or the same (between the user selected timeframe 406 and the automatically selected timeframe 408).

As another example, a size of each bubble 426 may represent the scale of the number of network events included in the user selected timeframe 406 and the number of network events included in the automatically selected timeframe 408, relative to one another. Thus, the size of each bubble 426 may indicate whether the network events associated with the objects intersected by the bubble 426 trend towards being a greater number of the type indicated by the color, a lesser number of the type indicated by the color, or the same number of the type indicated by the color.

Figure 5:
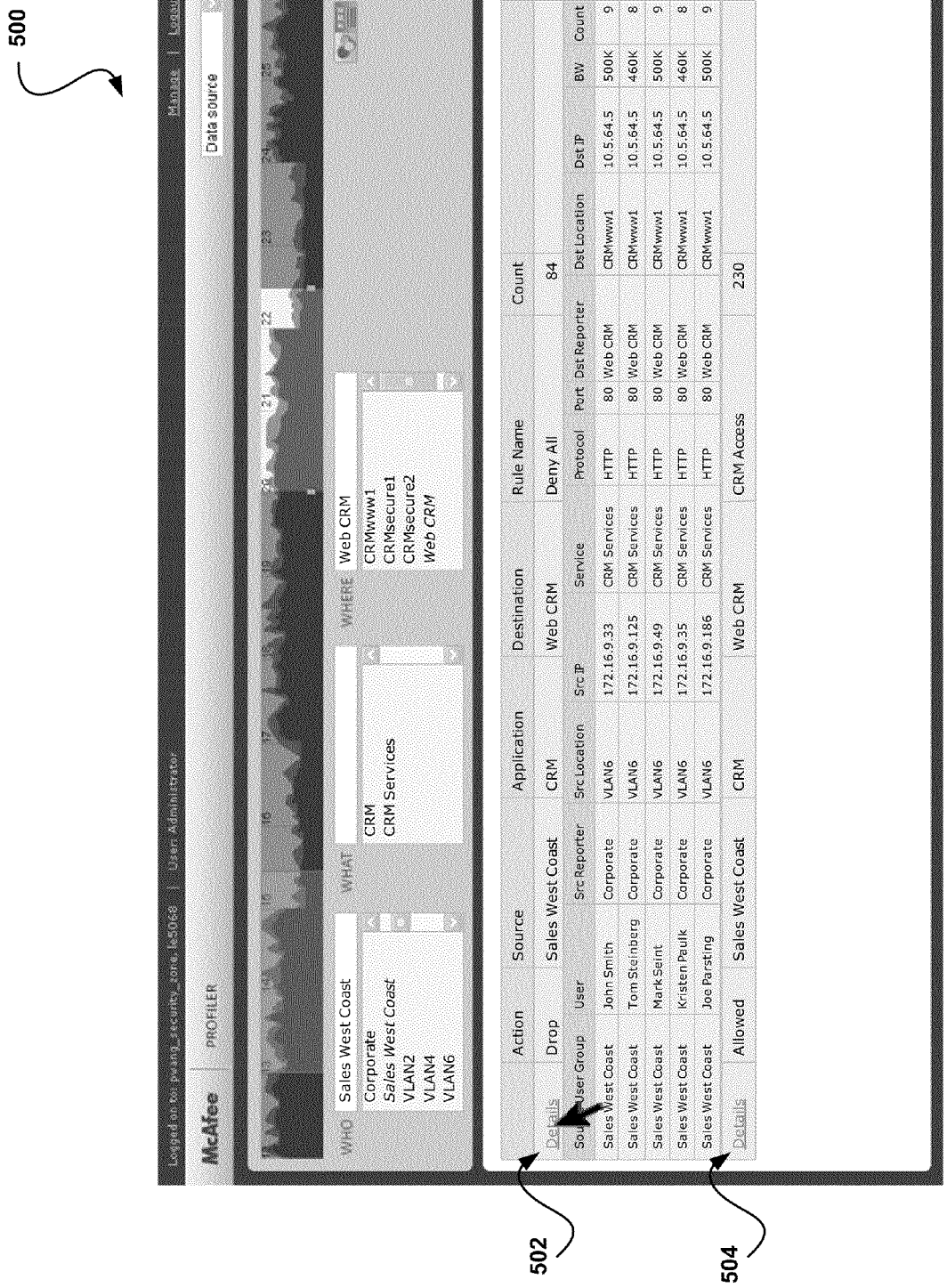

Upon selection of one of the bubbles 426 in the GUI 400 described above (as indicated by the arrow shown in the GUI 400), the GUI 500 shown in FIG. 5 may be displayed. As shown, the GUI 500 displays details of network events summarized by the selected bubble 426. As an alternative to the GUI 500 shown, the user may opt to switch to a pure table view in order to gain quick access to the details of the filtered network events.

The GUI 500 includes a first selectable option 502, which upon selection displays details of each denied network event summarized by the selected bubble 426. A second selectable option 504 displays details of each allowed network event summarized by the selected bubble 426, upon the selection thereof. As shown, the details for each network event may include a source of the network traffic described by the network event (including a user group, user, reporting object, location, and IP address), an application utilized to transmit the network traffic (including a service, protocol, and port), a destination of the network traffic (including a destination reporting object, a destination location, a destination IP address), a name of a rule based on which the network event was generated, bandwidth used to transmit the network traffic, and a number of occurrences of the network event.

Figure 6:
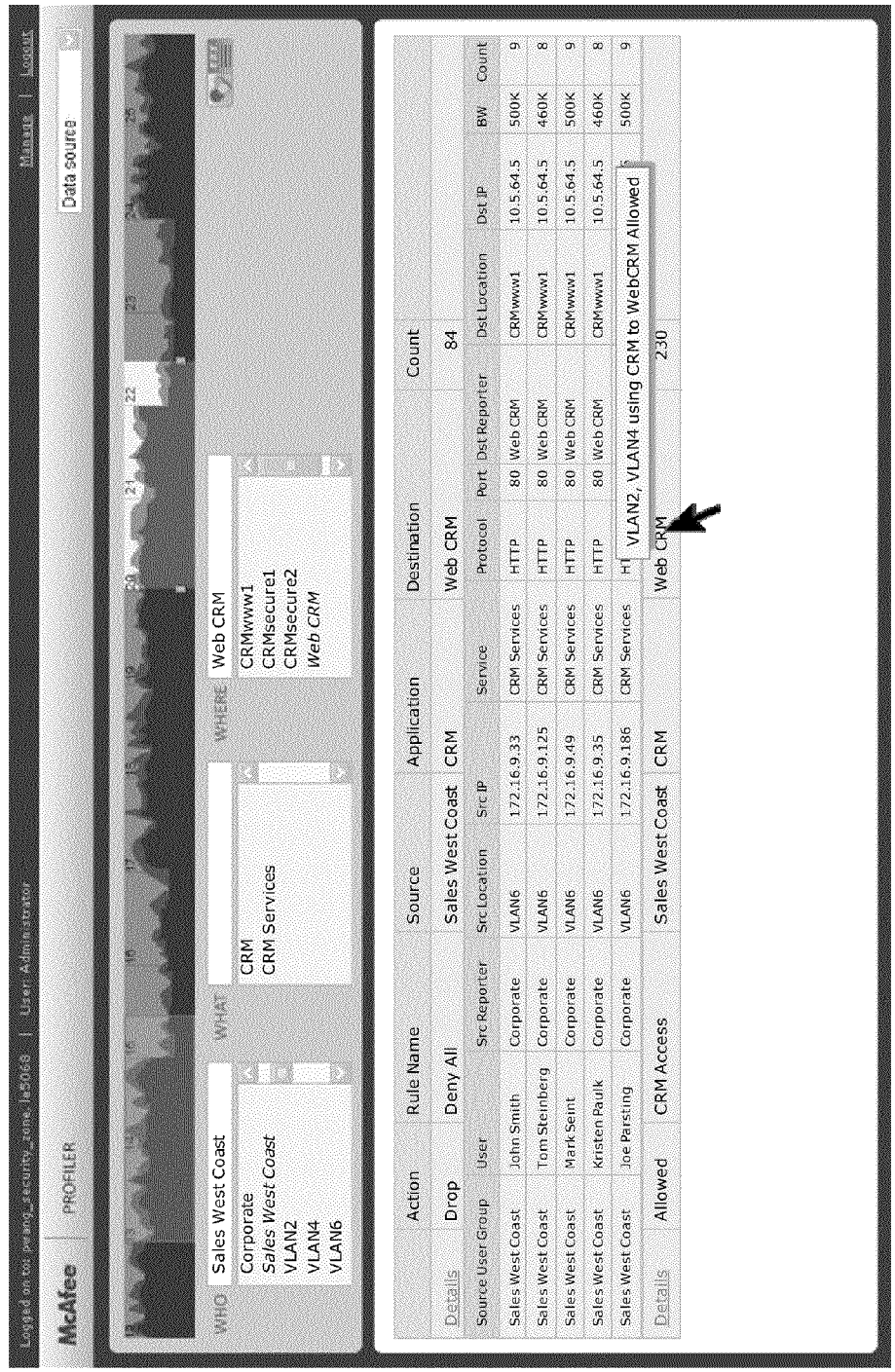

Further, as shown in the GUI 600 in FIG. 6, mousing over any of the objects based on which the network events are filtered (which are displayed in the GUI 500 of FIG. 5) may result in display of a pop-up interface showing the rule based on which the network event was generated. In this way, the user may easily identify which rule resulted in the generation of the network events, and thus whether such rule should be modified to subsequently generate a different set of network events.

In one exemplary embodiment, a user may determine that he is incapable of accessing a customer relationship management (CRM) application through the Web. In response, an administrator different from the user (and not knowing the user group that the user is a member of) may access an application providing the GUIs 400-700, and may select a time frame associated with the denial of the user's access to the CRM application. Upon selection of the time frame, the bubble chart 412 may indicate a change in network events for the "Sales West Coast" user group with respect to the "Web CRM." Specifically, the bubble 426 summarizing network events sourced at the "Sales West Coast" user group and destined for the "Web CRM" may indicate that the network events have trended towards being denied.

The administrator may select the aforementioned bubble 426 and the GUI 500 shown in FIG. 5 may be displayed. The administrator may further select to view details of the denied network events, and from the displayed details the administrator may verify that network traffic sourced from the user is being denied. The administrator may also select to view details of the allowed network events to determine a difference between the network events that are being allowed and those that are being denied. In the present exemplary embodiment, the difference may be that the source location of the allowed network events and the denied network events are different.

Once the administrator hovers over "CRM Access" in the GUI 500, a pop-up showing the rule that generated the network events is displayed, as shown in the GUI 600 of FIG. 6. Viewing the rule may allow the administrator to determine that the location being used by the user to access the CRM application via the Web is not indicated in the rule as being an allowable location from which the CRM application may be accessed. Thus, the administrator may determine that the location of the user when attempting to access the CRM application has changed, and may modify the rule to include the new location of the user such that the user may access the CRM application from the new location.

Figure 7:
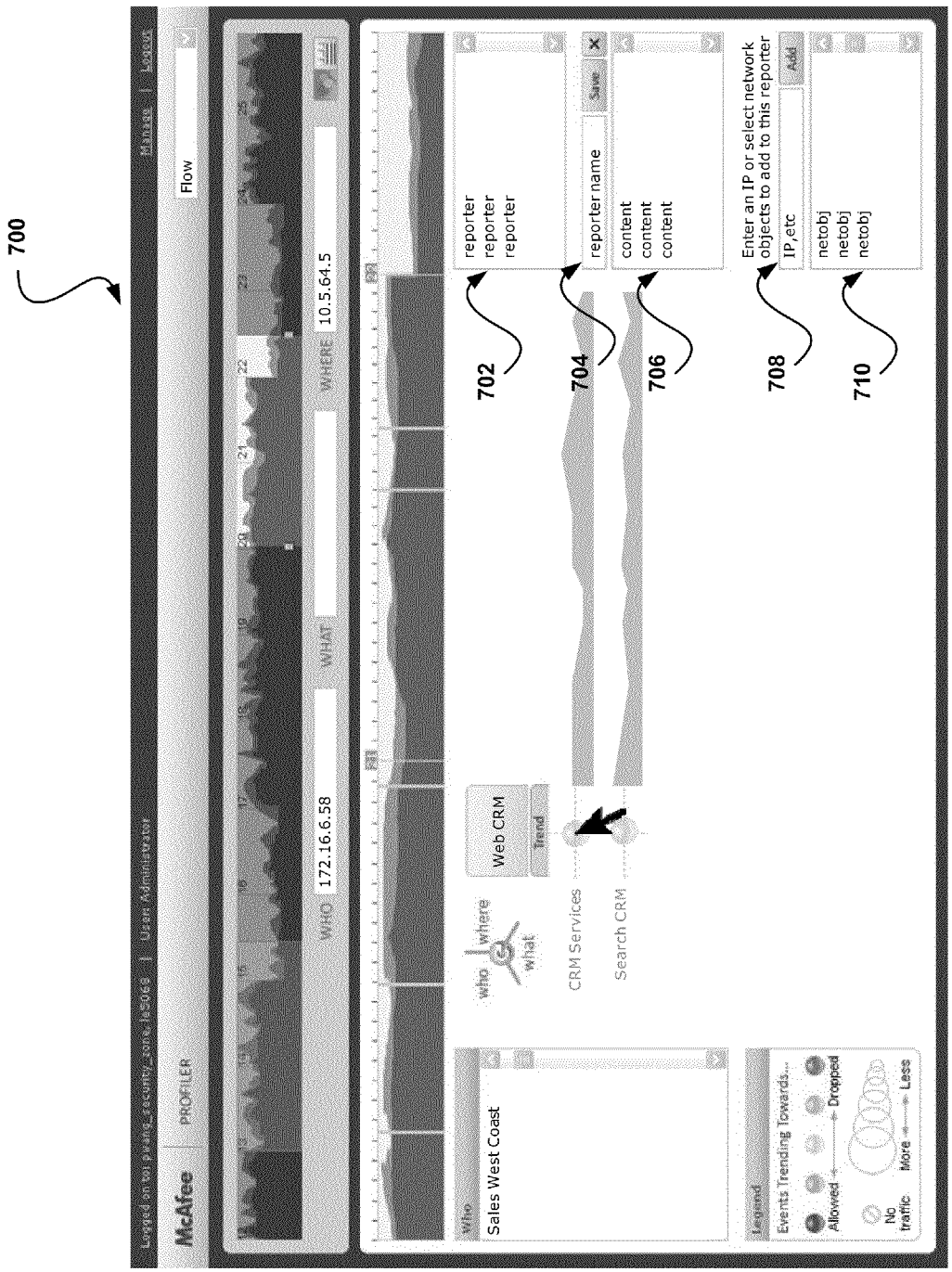

Still yet, the user may select any single column of the bubble graph 412 in FIG. 4, as shown in the GUI 700 of FIG. 7, for filtering the displayed network events to those associated with the object represented by the selected column. Upon selection of a single column, a series of trend graphs, each extending out from a different bubble 426 included in the column, are displayed showing the relationship between the object associated with the selected column to the object associated with the particular row in which the bubble 426 is located. For example, the trend graphs may show data relating to the network events that made up the associated bubbles 426 over the selected time period.

By selecting a single column, information known about the object represented by the single column may be presented within the context of the network events associated with such object. As shown in the GUI 700 of FIG. 7, a reporting objects list 702 is provided in which a list of reporting objects (shown as "reporters") is displayed. The reporting objects may each include a grouping of a plurality of objects managed by a security appliance and/or routing device. In various embodiments, the reporting objects may include an intranet reporting object (e.g. a grouping of devices on an Intranet), an extranet partners reporting object (e.g. a grouping of devices on an extranet), a web CRM reporting object (e.g. a grouping of devices associated with a web CRM), etc. Just by way of example, one of the reporting objects may include a "Web Servers" reporting object which may include hosts known to be offering web services, or clients belonging to a directory group of the same name, or simply hosts with "web server" in their name, etc.

The user may select one of the reporting objects included in the reporting objects list 702, which may automatically result in the bubble graph being populated with an axis including the selected reporting object. Of course, the selection may be automatic based on the above described selection of the single column, such that the reporting object associated with the selected single column is automatically selected. In addition, a reporter name field 704 may be automatically updated with a name of the selected reporting object, upon the selection of the reporting object. Furthermore, content associated with the reporter name may be automatically displayed in a content list 706. The content may include any identifier (e.g. IP address, etc.) of each of the objects grouped by the reporting object.

The user may also utilize the GUI 700 to modify the selected reporting object. In one embodiment, the user may select a network objects to be added to the selected reporting object from a network objects list 710. Thus, the network objects list 710 may optionally list a plurality of objects capable of being added to the selected reporting object. In another embodiment, the user may input an IP address (or other identifier) of a network object into a network object field 708 for adding the network object identified by the IP address to the selected reporting object. Of course, by modifying the selected reporting object, the network traffic reported by the bubble graph may be automatically updated to reflect such modified reporting object.

Viewing the object's composition in this manner may dramatically increase the user's ability to understand the object's behavior. Further, allowing the user to edit the object's composition within the context of its behavior may allow the user to view near real-time results from modifications to the policy based on which the network events were generated, while continuing the comparison to the object's past behavior.

In another exemplary embodiment, an intrusion prevention system (IPS) administrator receives an alert regarding a network attack with a source IP address of a particular source IP address and destination IP address. The IPS administrator may desire to understand the user and server profile to assess a priority of the alert. Accordingly, the IPS administrator may log into an application providing the GUIs 400-700 and may select a time period during which the alert was received.

The IPS administrator may enter the source IP address into the source object filter field (i.e. "WHO"), and in response the bubble chart may be generated with an axis including the user group ("Sales West Coast") of which the source IP address is a member. To this end, the IPS administrator identify the user group of which the source IP address is a member, in addition to the applications being used across the rest of the network.

The IPS administrator may enter the destination IP address into the destination object filter field (i.e. "WHERE"), and in response the bubble chart may further include an axis whose only column is the destination associated with the destination IP address (shown as "Web CRM" in FIG. 7). Trend graphs relating to the network events summarized by the bubble chart in FIG. 7 may be displayed automatically. Further, the IPS administrator may select a bubble (the bubble intersecting "Sales West Coast" and "Web CRM" shown in FIG. 7) for accessing details of the network events summarized by that bubble.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory tangible computer readable medium for performing operations in conjunction with a processor, the operations comprising:
   receiving network events that are generated in response to a policy that outlines which segments of network traffic should be monitored to identify the network events, and wherein the policy includes a rule that indicates particular network traffic that was denied from being forwarded to a destination from a security appliance as qualifying to be included in the network events; and
   displaying the network events in terms of objects being managed by at least one of the security appliance and a routing device, wherein the displaying includes displaying a trend graph illustrating a volume of data over a particular timeframe and a comparison of allowed network events and denied network events.

2. The computer program product of claim 1, wherein the computer program product is operable such that the network events are received from the at least one of the security appliance and the routing device.

3. The computer program product of claim 1, wherein the network events include a description of network traffic processed by the at least one of the security appliance and the routing device.

4. The computer program product of claim 3, wherein the description identifies a source of the network traffic, a destination of the network traffic, and an application utilized for communicating the network traffic.

5. The computer program product of claim 4, wherein the application includes a port number, a service, a protocol, or an identifier.

6. The computer program product of claim 1, wherein the computer program product is operable such that displaying the network events in terms of the objects being managed by the at least one of the security appliance and the routing device includes displaying a summary of the network events utilizing a graph with axes indicative of the objects.

7. The computer program product of claim 6, wherein the objects include at least one source of network traffic from which the network events were generated, such that a first one of the axes represents the at least one source.

8. The computer program product of claim 6, wherein the objects include at least one destination of network traffic from which the network events were generated, such that a second one of the axes represents the at least one destination.

9. The computer program product of claim 6, wherein the objects include at least one application utilized for communicating network traffic from which the network events were generated, such that a third one of the axes represents the at least one application.

10. The computer program product of claim 1, wherein the computer program product is operable such that the objects being managed by the security appliance are defined in a policy of the security appliance.

11. The computer program product of claim 1, wherein the computer program product is operable such that the objects being managed by the routing device are defined in a policy of an application displaying the network events in terms of the objects.

12. The computer program product of claim 1, wherein the displayed network events include a subset of all received network events.

13. The computer program product of claim 12, wherein the subset includes network events that occurred during a first time period selected by a user.

14. The computer program product of claim 13, wherein the subset includes network events that occurred during a second time period automatically selected based on the first time period.

15. The computer program product of claim 14, wherein the first time period is different from the second time period.

16. The computer program product of claim 14, wherein the computer program product is operable such that the network events are displayed in a manner that compares the network events that occurred during the first time period with the network events that occurred during the second time period.

17. The computer program product of claim 15, wherein the computer program product is operable such that the comparison is utilized for indicating an effect of a change to a configuration of the management of the objects that occurred between the first time period and the second time period.

18. A method to be performed in conjunction with a processor and a memory, the method comprising:
receiving network events that are generated in response to a policy that outlines which segments of network traffic should be monitored to identify the network events, and wherein the policy includes a rule that indicates particular network traffic that was denied from being forwarded to a destination from a security appliance as qualifying to be included in the network events; and
displaying the network events in terms of objects being managed by at least one of the security appliance and a routing device, wherein the displaying includes displaying a trend graph illustrating a volume of data over a particular timeframe and a comparison of allowed network events and denied network events.

19. A system, comprising:
a processor and a memory, wherein the system is configured for:
receiving network events that are generated in response to a policy that outlines which segments of network traffic should be monitored to identify the network events, and wherein the policy includes a rule that indicates particular network traffic that was denied from being forwarded to a destination from a security appliance as qualifying to be included in the network events, and
displaying the network events in terms of objects being managed by at least one of the security appliance and a routing device, wherein the displaying includes displaying a trend graph illustrating a volume of data over a particular timeframe and a comparison of allowed network events and denied network events.

20. The system of claim 19, wherein the processor is coupled to the memory via a bus.

\* \* \* \* \*